United States Patent
Barkley et al.

(10) Patent No.: US 10,803,570 B2
(45) Date of Patent: Oct. 13, 2020

(54) METHOD AND SYSTEM FOR A MEASURE OF VISIBILITY FROM A SINGLE DAYTIME IMAGE

(71) Applicant: Eagle Technology, LLC, Wilmington, DE (US)

(72) Inventors: Russell Barkley, Durham, NC (US); Sharon Lunt, Webster, NY (US)

(73) Assignee: Eagle Technology, LLC, Wilmington, DE (US)

( * ) Notice: Subject to any disclaimer, the term of this patent is extended or adjusted under 35 U.S.C. 154(b) by 244 days.

(21) Appl. No.: 15/976,852

(22) Filed: May 10, 2018

(65) Prior Publication Data

US 2019/0347778 A1 Nov. 14, 2019

(51) Int. Cl.
*G06T 7/00* (2017.01)
*G06T 7/13* (2017.01)
(Continued)

(52) U.S. Cl.
CPC .............. *G06T 7/0002* (2013.01); *G06T 7/11* (2017.01); *G06T 7/13* (2017.01); *G06T 7/136* (2017.01);
(Continued)

(58) Field of Classification Search
None
See application file for complete search history.

(56) References Cited

U.S. PATENT DOCUMENTS 4,216,498 A 8/1980 Evans
5,987,152 A 11/1999 Weisser
(Continued)

FOREIGN PATENT DOCUMENTS

DE 2003103046 10/2004
DE 102005035810 1/2007
(Continued)

OTHER PUBLICATIONS

Ancuti, Codruta O., et al. "A fast semi-inverse approach to detect and remove the haze from a single image." Asian Conference on Computer Vision. Springer, Berlin, Heidelberg, 2010. (Year: 2016).*
(Continued)

*Primary Examiner* — Kim Y Vu
*Assistant Examiner* — Nathan J Bloom
(74) *Attorney, Agent, or Firm* — Davidson Berquist Jackson & Gowdey LLP

(57) ABSTRACT

Methods and systems in accordance with the present invention provide a continuum measure of visibility from a single image without prior knowledge of the camera system or the cameras in the system. This may be, for example, a score on the weather visibility quality of the image, ranging from good to poor, or a numeric score representing the weather visibility quality of the terrain in the image. This may be done without prior knowledge of the camera system, the camera that took the image, or the environment. It is also done with the single image without using multiple images, or reference images. The system derives a real-time continuum measure of visibility from a single daytime image, with unknown camera quality, system configuration, and environmental conditions.

15 Claims, 28 Drawing Sheets

(51) Int. Cl.
*G06T 7/11* (2017.01)
*G06T 7/90* (2017.01)
*G06T 7/136* (2017.01)

(52) U.S. Cl.
CPC ...... *G06T 7/90* (2017.01); *G06T 2207/10024* (2013.01); *G06T 2207/30168* (2013.01); *G06T 2207/30192* (2013.01)

(56) References Cited

U.S. PATENT DOCUMENTS

| | | | | |
|---|---|---|---|---|
| 6,085,152 | A * | 7/2000 | Doerfel | G06K 9/28 702/3 |
| 7,274,386 | B2 | 9/2007 | Pochmuller | |
| 7,656,277 | B2 | 2/2010 | Kawasaki | |
| 2002/0181739 | A1 * | 12/2002 | Hallowell | G01W 1/02 382/100 |
| 2005/0270537 | A1 * | 12/2005 | Mian | G01N 21/538 356/437 |
| 2007/0263902 | A1 | 11/2007 | Higuchi | |
| 2013/0336526 | A1 * | 12/2013 | Cetin | G06K 9/00147 382/103 |
| 2015/0317535 | A1 | 11/2015 | Lenor | |
| 2016/0132745 | A1 * | 5/2016 | Falb | G06K 9/4604 348/148 |

FOREIGN PATENT DOCUMENTS

| | | |
|---|---|---|
| EP | 0687594 A1 | 12/1995 |
| EP | 1498721 A1 | 1/2005 |
| EP | 1868161 | 12/2007 |
| JP | 3444192 | 11/1999 |
| JP | 3312729 | 1/2001 |
| JP | 2006221467 | 8/2006 |
| JP | 2006349492 | 12/2006 |
| WO | WO 2003069275 | 8/2003 |

OTHER PUBLICATIONS

Lu, Huimin, et al. "Single image dehazing through improved atmospheric light estimation." Multimedia Tools and Applications 75.24 (2016): 17081-17096. (Year: 2016).*
Automatic Fog Detection and Estimation of Visibility distance through use of an onboard camera—Nicolas Hautiere.
Fog detection system based on computer vision techniques—Bronte, S.
Image based fog detection and visibility estimation for driving assistance systems—Mihai Negru.
Multiview Visibility Estimation for Image-Based Modeling—Liu-Xin Zhang.
Prototype System for Atmospheric Visibility Estimation Based on Image Analysis and Learning—Xi Xu.
Visibility Estimation Based on Mean Shift—Wenbing Chen.
Visibility in Bad Weather from a Single Image.

* cited by examiner

Sample Image fog

Sample image rain

Input Image 602

Haze Image 702

Edge Image 802

First Cut Sky Image 1102

Initial Sky Pixels 1302

New Sky Pixels 1502

Appended Sky Pixels 1602

Sky Pixels 1702

Saturated Pixels 1802

Terrain with Contrast 1902

Uniform Terrain 2002

Terrain Image 2102

METHOD AND SYSTEM FOR A MEASURE OF VISIBILITY FROM A SINGLE DAYTIME IMAGE

BACKGROUND

Many companies and people require reliable, real-time, precise, hyper-local knowledge of extreme weather conditions for safety of life and property. This includes various reasons such as safety for flying or for weather forecasting. In some cases, knowledge of weather conditions for precise locations may be useful or even critical. Accurately quantifying visibility conditions is a factor in safeguarding life, for example, when operating a vehicle on land, sea or in the air. When flying, for example, a pilot may want to know that they will be able to see the landing tarmac and avoid potential obstacles. In weather forecasting, precise, hyper-local weather conditions on the ground can provide valuable information to increase accuracy, and verify and improve forecast capabilities. Some conventional systems offer access to live camera feeds covering, for example, most of North America from a variety of providers, with variable quality and without supporting information on the camera or environmental conditions.

One problem is that the cameras are unknown and part of an unknown system. Not knowing the properties, quality, calibration and positioning of the cameras in the system poses a barrier to determining the true visibility quality of the weather itself. In addition, cameras may have varying quality and resolution. As such, to accurately determine weather conditions, a company or person would have to put up their own cameras just to have prior knowledge of the cameras, which would be costly and often cost prohibitive. Furthermore, if the cameras themselves are poor, the weather visibility determination may be inaccurate due to the camera quality alone.

Some conventional systems use a closed system, such that data about the camera is known. However, this requires maintenance, building of, or having access to, a closed system that is known in advance. The operators of these conventional systems may know exactly where the camera is, have information on the calibration and type of camera, and know where it is aimed. These systems may take such information to assist in determining weather visibility from the imagery.

For applications that do not have access to such a closed system, an accurate weather visibility quality determination from camera images is difficult. Without known cameras and access to prior information about the cameras themselves, some conventional systems make the visibility determination by requiring and using multiple images of the same scene to determine visibility quality. These may use a reference image, such as an image of a very clear day from the same camera position for example, to use as a benchmark to compare against a current image.

Many conventional systems require prior camera knowledge, a closed system, a 3-D model of the scene, stereo cameras, multiple images of the same scene, and/or dependencies on the scene being a road with lane markings. These approaches are typically based in principal on the Beer-Lambert Law, which is generally fundamental for image-based visibility measurements. These conventional systems primarily leverage images' brightness and contrast, as well as image segmentation based on a closed system for region-based processing.

However, the prerequisites to implement conventional systems are costly, with the infrastructure in place. Today, there are tens of thousands of traffic cameras providing live-feeds across North America, as well as other camera providers (e.g., FAA). These images contain real-time weather conditions, but all that is known is the image dimensions, time of the image, and imprecise geographic location. These limited inputs do not meet the conventional prerequisites for automatically determining visibility of the environment.

Conventional systems do not provide a visibility score based on an unknown camera system with a single daytime image. Accordingly, there is a desire to solve these and other related problems.

SUMMARY

In accordance with the present invention, a method in a data processing system is provided for determining a measure of visibility from a single daytime image without prior knowledge of a camera that created the image, comprising receiving the daytime image from the camera without information about the camera. The method further comprises determining a score of visibility of the received daytime image based on the daytime image without being based on information about the camera and without being based on another image, and transmitting the determined score of visibility of the received daytime image.

In one implementation, a method in a data processing system for determining a measure of visibility from single daytime image without prior knowledge of a camera that created the image, comprising receiving a daytime image from the camera without information about the camera, and determining a white point of the daytime image. The method further comprises calculating haze of the daytime image to create a haze image, detecting edges of the daytime image to create an edge image, and segmenting the daytime image into (1) sky, (2) terrain with contrast and (3) uniform terrain, using the haze image and the edge image to create a segmented image. Additionally, the method comprises calculating metrics from the terrain with contrast and uniform terrain of the segmented image, determining a visibility score from each metric using an equation corresponding to the metric, and determining a final visibility score by determining a weighted average of the visibility scores corresponding to the metrics.

In another implementation, a data processing system is provided for determining a measure of visibility from a single daytime image without prior knowledge of a camera that created the image, comprising a memory storing instructions to cause a processor to receive a daytime image from the camera without information about the camera. The instructions also cause the processor to determine a score of visibility of the received daytime image based on the daytime image without being based on information about the camera and without being based on another image, and transmit the determined score of visibility of the received daytime image. The processor is also configured to execute the instructions.

DETAILED DESCRIPTION

Methods and systems in accordance with the present invention provide a continuum measure of visibility from a single image without prior knowledge of the camera system or the cameras in the system. This may be, for example, a score on the weather visibility quality observed in the image, ranging from good to poor, or a numeric score representing the weather visibility quality in the image. This may be done without prior knowledge of the camera system, the camera that took the image, or the environment. It is also done with the single image alone without using multiple images, or reference images. The system derives a real-time continuum measure of visibility from a single daytime image, with unknown camera quality, system configuration, and environmental conditions.

A continuum measure or value of visibility using daytime images from a variety of different providers may be provided. Without outside access to closed systems, the type or quality of the camera may not be known; the camera system may only provide the location of the camera and the time the image was captured. A continuum measure of visibility may provide a value or score of environmental visibility from very poor to great, or a numeric value similarly representing the visibility. The system provides an image analytic that estimates visibility from a single, uncalibrated and uncharacterized daytime image, without advance system or environmental knowledge.

Figure 1:
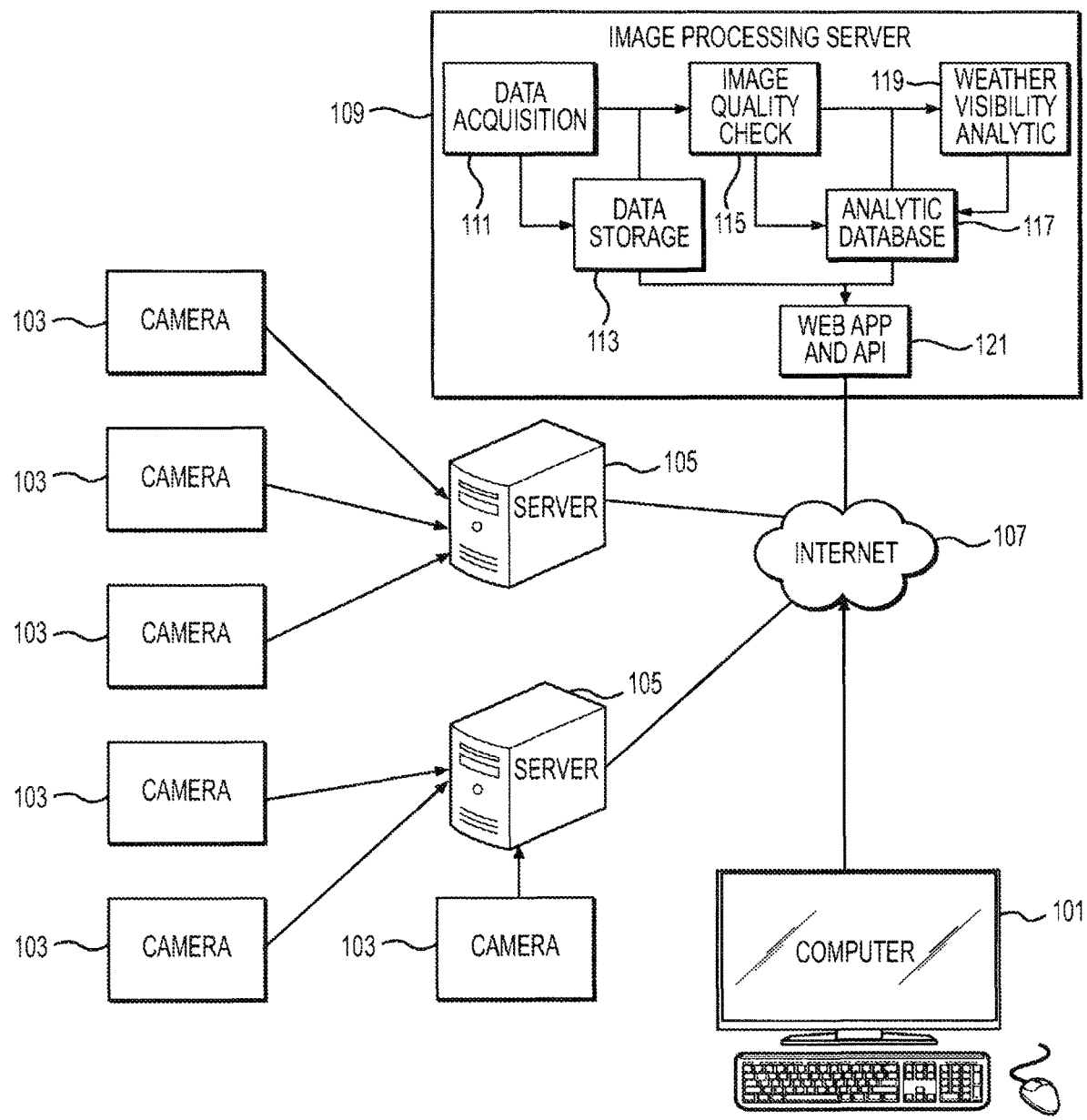
FIG. 1 depicts a system for determining a weather visibility analytic score from a single daytime image in accordance with the present invention.

FIG. 1 depicts a system for determining a weather visibility analytic score from a single daytime image in accordance with the present invention. FIG. 1 shows an exemplary computer network such as the Internet having a network of cameras 103 and corresponding camera provider servers 105 and image processing server 109. The image processing system in accordance with the present invention may, for example, be on a server 109 connected to the internet. Alternatively, the image processing system may be on a computer 101. The cameras 103 may be on a closed system or an open system, or any combination of the two. The cameras may feed their information to corresponding camera provider servers 105, which may in turn provide the information to the image processing server 109 or the user's computer 101 across a network 107 such as the internet. The user's computer 101 may access the image processing server 109 and receive the visibility score for an image, for example.

Computer 101 may be a computer or server or having the components described below and may implement methods and systems consistent with the present invention. Camera servers 105 may be accessed by computers 101. There may be any number of user computers 101, cameras 103 or server computers 105. Image processing server 109 and/or computer 101 may determine a visibility score from a single daytime image without prior knowledge of the camera system providing the image.

The camera servers 105 may be servers of camera service providers such as TrafficLand, any state's Department of Transportation, or any other camera service provider. The camera servers 105 receive live camera feeds from the cameras 103. The image processing server 109 accesses the camera servers 105, for example, over the internet or other network. In the image processing server 109, the data acquisition 111 may be a scheduled service that obtains imagery and ancillary data from the camera feeds from cameras 103 and camera provider servers 105 and stores it in the data storage 113, if specified conditions are met. For example, conditions may be if the time of day is during daylight hours (e.g., 8 am-5 pm local camera time), the camera provider is one that produces reliable data (e.g., provider A but not provider B), and camera quality rating is above the quality threshold (e.g., the camera is rated as 5 stars for quality and the threshold is 3, therefore the camera data would be used). The image quality check module 115 in the image processing server 109 identifies if the image contains sufficient information (i.e., quality) to extract image-based features. The image quality check is optional. The results of the image quality check 115 are then stored in the analytic database 117. The weather visibility analytic module 119 is executed on imagery that passes the image quality check 115 and the analytic results are stored in the analytic database 117. The data storage 113 contains imagery and ancillary data from the data acquisition 111.

The analytic database 117 stores results from the image quality checks 115 and weather visibility analytic 119. The web application and API 121 is the frontend service that enables the user to interrogate the stored data in the data storage 113 and corresponding analytic results in the analytic data base 117. The end user's computer 101 or server interacts with the web app/API 121 to extract and view data (e.g., imagery) and corresponding analytic results for real-time ground weather intelligence. Any of the modules and databases may be implemented in software, hardware or a combination of both.

Figure 2:
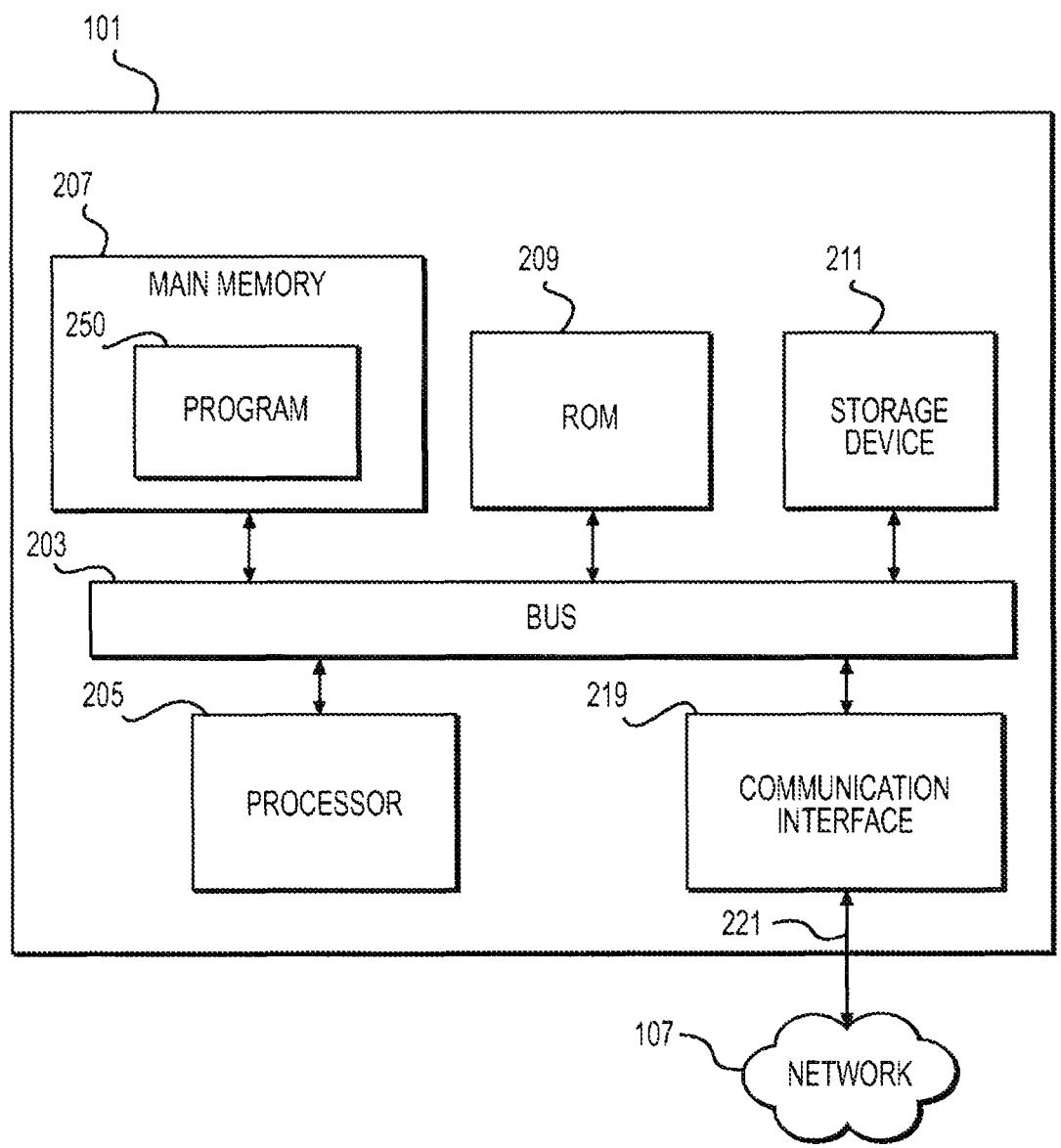
FIG. 2 illustrates an exemplary computer system consistent with systems and methods consistent with the present invention.

FIG. 2 illustrates an exemplary computer system 101 consistent with systems and methods consistent with the present invention. Computer 101 includes a bus 203 or other communication mechanism for communicating information, and a processor 205 coupled with bus 203 for processing the information. Computer 101 also includes a main memory 207, such as a random access memory (RAM) or other dynamic storage device, coupled to bus 203 for storing information and instructions to be executed by processor 205. In addition, main memory 207 may be used for storing temporary variables or other intermediate information during execution of instructions to be executed by processor 205. Main memory 207 includes a program 250 for implementing weather visibility image analytics consistent with methods and systems consistent with the present invention. Computer 101 further includes a read only memory (ROM) 209 or other static storage device coupled to bus 203 for storing static information and instructions for processor 205. A storage device 211, such as flash drive, hard drive, a magnetic disk or optical disk, is provided and coupled to bus 203 for storing information and instructions.

According to one embodiment, processor 205 executes one or more sequences of one or more instructions contained in main memory 207. Such instructions may be read into main memory 207 from another computer-readable medium, such as storage device 211. Execution of the sequences of instructions in main memory 207 causes processor 205 to perform the process steps described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Although described relative to main memory 207 and storage device 211, instructions and other aspects of methods and systems consistent with the present invention may reside on another computer-readable medium, such as a flash drive, hard disk, floppy disk, a flexible disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Computer 101 also includes a communication interface 219 coupled to bus 203. Communication interface 219 provides a two-way data communication coupling to a network link 221 that is connected to a network 107, such as the Internet or other computer network. Wireless links may also be implemented. In any such implementation, communication interface 219 sends and receives signals that carry digital data streams representing various types of information.

Figure 3:
FIG. 3 shows two exemplary daytime images having different levels of visibility of the same road due to fog.

FIG. 3 shows two exemplary daytime images of the same road as an example of different visibilities for daytime images due to fog, for example. These are examples of images for which the system may determine a measure of visibility. The visibility score for the image on the left would be different than the visibility score for the image on the right.

Figure 4:
FIG. 4 shows two exemplary daytime images having different levels of visibility of the same road due to precipitation.

FIG. 4 shows two other exemplary daytime images of the same road as an example of different visibilities for daytime images due to precipitation, for example.

Figure 5:
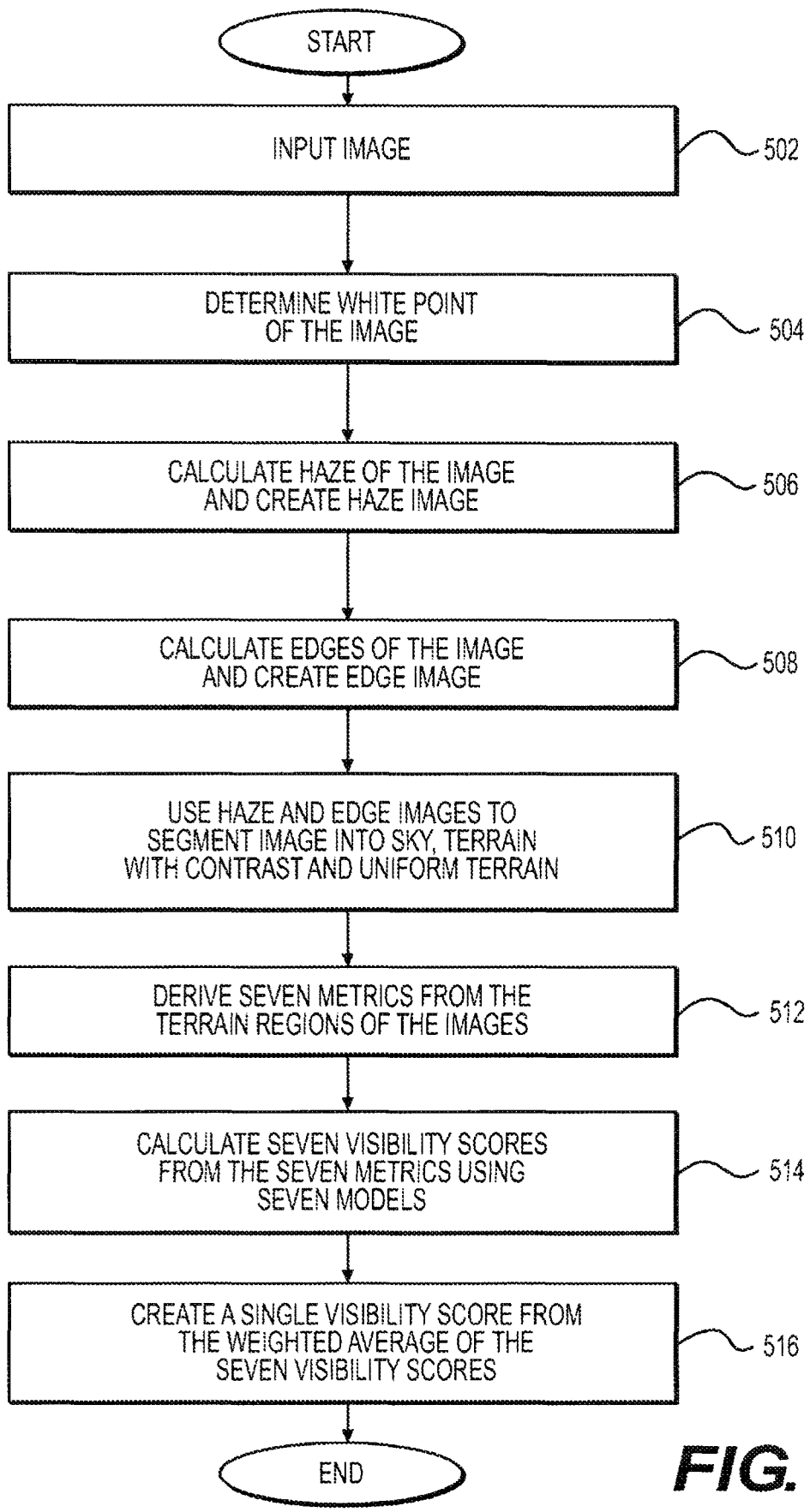
FIG. 5 depicts a flowchart in a method for determining a measure of visibility from a single daytime image.

FIG. 5 depicts a flowchart in a method for determining a measure of visibility from a single daytime image. First, a single image to be evaluated is input on computer 101 (step 502) and sent to the image processing server 109.

Figure 6:
FIG. 6 shows an example input image to be segmented in the image segmentation process.

FIG. 6 shows an example input image 602 to be segmented in the image segmentation process. This image may be, for example, a true color, red-green-blue image.

Next, the system (on the image processing server 109) determines the "white point" of the image (step 504). Determining the white point of an image is a known process in the art. In one implementation, the white point of the image may be determined using Binary Dependent Linear Stretch, which is disclosed in U.S. Pat. No. 9,147,228 which is incorporated by reference herein. Generally, it determines how bright the scattered light is within the scene and for color balancing the image. The white point is used to help derive the haze in the image, as discussed below. When determining a white point, the system determines a value for each band (red, green and blue) and outputs 3 numbers.

Figure 7:
FIG. 7 depicts an exemplary haze image created from the original input image.

FIG. 7 depicts an exemplary haze image 702 created from the original image 602. Next, the system derives the haze of the image 602 (step 506). The haze generally is how much obstruction is between the camera and the object being viewed. If there is a lot of obstruction, it will likely appear light and uniform. Haze images 702 appear somewhat similar to an original image except may be in black and white, and may be blockier. If there is a lot of obscuration, it will tend to be white; if there is less obscuration, it will tend to be dark.

The system may use the Robby T. Tan approach to derive the haze, and create a haze image 702. The Robby T. Tan approach, which is directed to restoring an image, is disclosed in Robby, T. Tan, *Visibility in Bad Weather from a Single Image,* Imperial College London (http://mplab.uc-sd.edu/wp-content/uploads/CVPR2008/Conference/data/papers/303.pdf) which is incorporated by reference herein. The system also uses the white point to derive haze. The haze is based on identifying where the contrast is maximized. The haze image 702 is similarly referred to as "Airlight" in the *Visibility in Bad Weather from a Single Image* paper.

Figure 8:
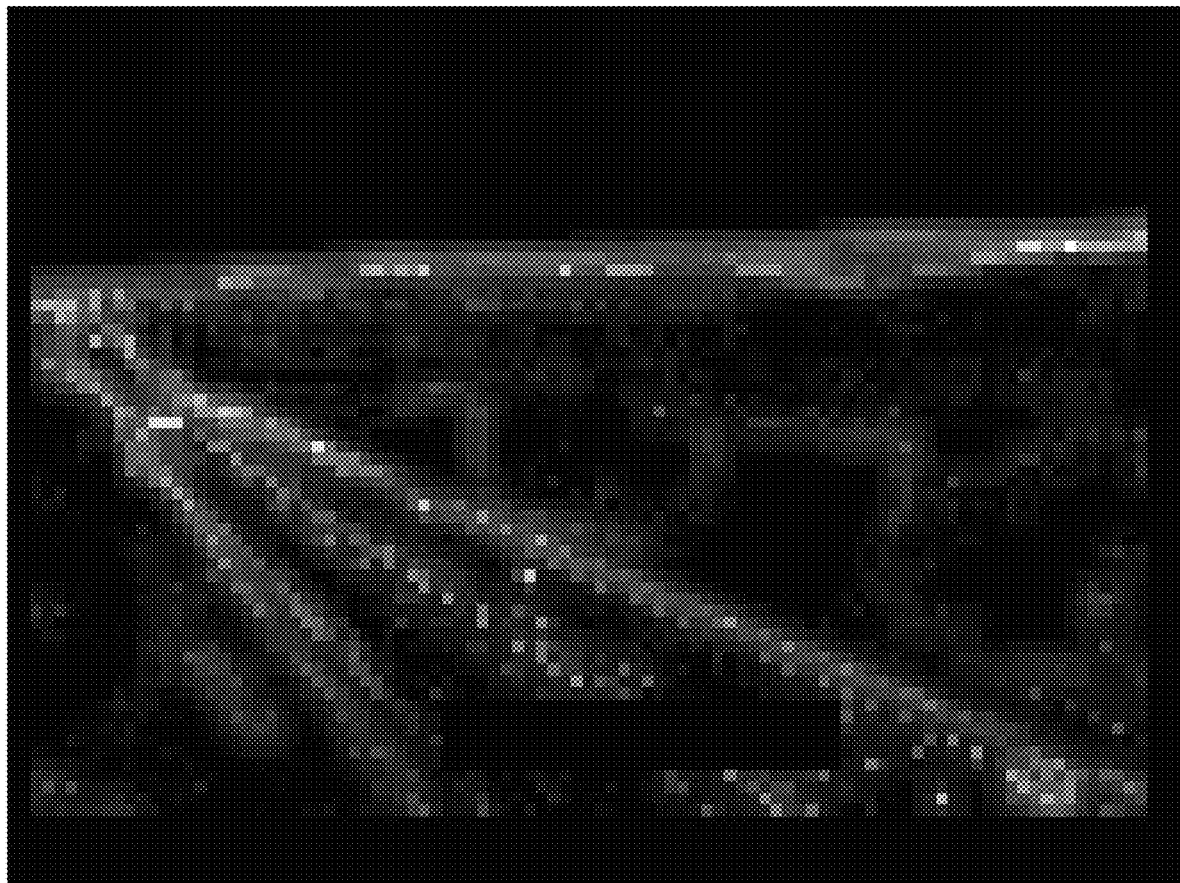
FIG. 8 depicts an exemplary edge image created from the original input image.

FIG. 8 depicts an exemplary edge image 802 created from the original input image 602 in FIG. 6. The system also uses edge detection to derive the edges within the image 602 to create an edge image 802 (step 508). Edge detection is performed on the original image 602, and the output of the edge detection is a new image referred to as an edge image 802. In the edge image 802 generally, where sharp edges occur are white lines and areas, and where there are not edges, the image is black. In one implementation, the haze image 702 and the edge image 802 are generated in parallel at the same time. Edge detection may be performed using any suitable method or process.

Next, the system uses the derived haze 702 and edge images 802 to segment the image 602 into the three classes: sky 902, terrain with contrast 904, and uniform terrain 906 (step 510). Features within the haze 702 and edge 802 images are used to perform the segmentation. Generally, the system uses the haze 702 and edge images 802 to determine the sky 902 area, which is typically bright and smooth. To find the sky 902, the system finds areas that are bright in a histogram of the haze image and uses the white point. The system also uses the edge image to determine where the sky is, because the area above the horizon should be smooth.

From determining the sky in the image, the terrain can be determined (i.e., the rest of the image that is not the sky 902). The edges within the terrain can be used to determine the terrain with contrast 904 and the uniform terrain 906. Additionally, use of the haze image 702 to segment the image differs from conventional systems. The derived haze and edge images are used in combination to identify smooth (edge image) and bright (haze image 702) portions of the image as the sky, then the remaining portion of the image (i.e. terrain) is further segmented, using the edge image, into regions with high-contrast edges and regions that are smooth.

Figure 9:
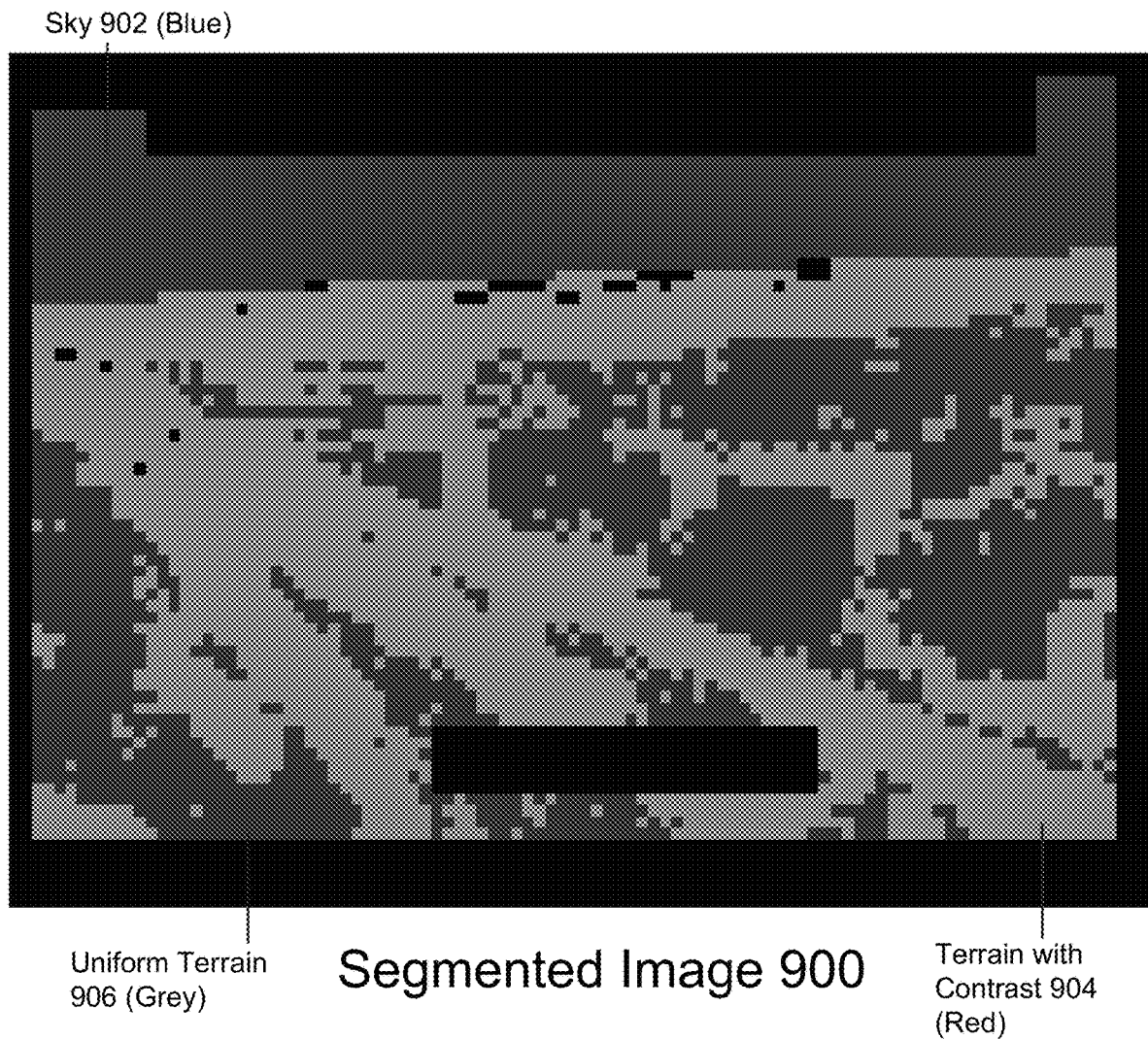
FIGS. 9 shows an example of an image segmented into three classes: sky, terrain with contrast and uniform terrain.

FIG. 9 shows an example of segmented images 900, which are a representation of the original image 602 segmented into the three classes, sky 902, terrain with contrast 904 and uniform terrain 906. In FIG. 9, the sky 902 is shown, and this may, for example, be blue. When there is poor visibility, the sky 902 may appear to fall lower than good visibility images. FIG. 9 also shows the uniform terrain 906, which may be grey. Finally, it shows the terrain with contrast 904, which may be red.

Generally, the terrain with contrast 904 is the area with objects of interest. These areas may be less uniform and have more distinct edges within them. The sky 902 is generally evaluated to determine what area can be ignored. The terrain with contrast 904 in an image may be where it can be determined where a road is, where the lines are on the road, where cars are, etc. The uniform terrain 906 is generally uniform areas without distinct edges.

Figure 10:
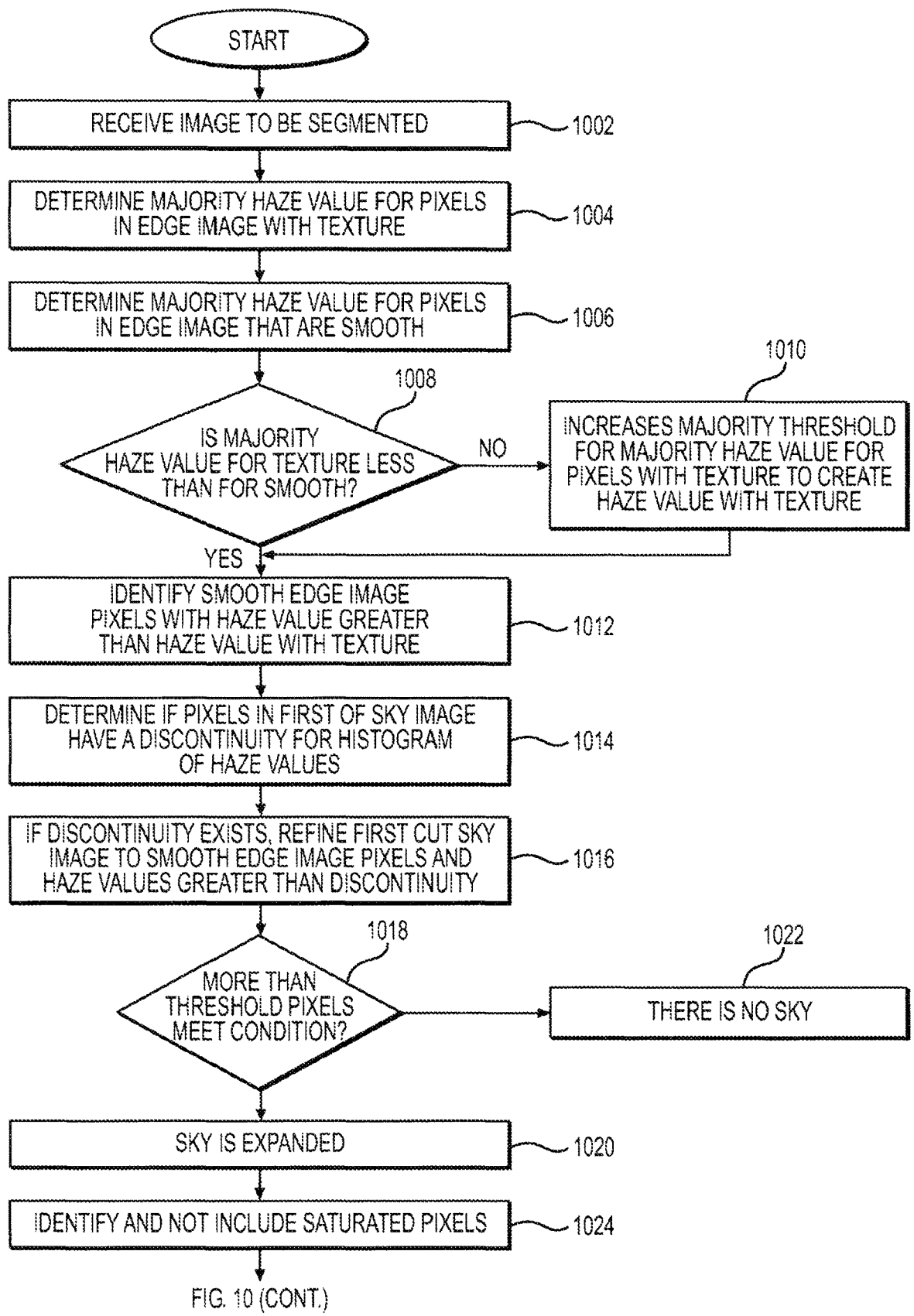
FIG. 10 illustrates more detailed steps in a method for segmenting an image.
Figure 10:
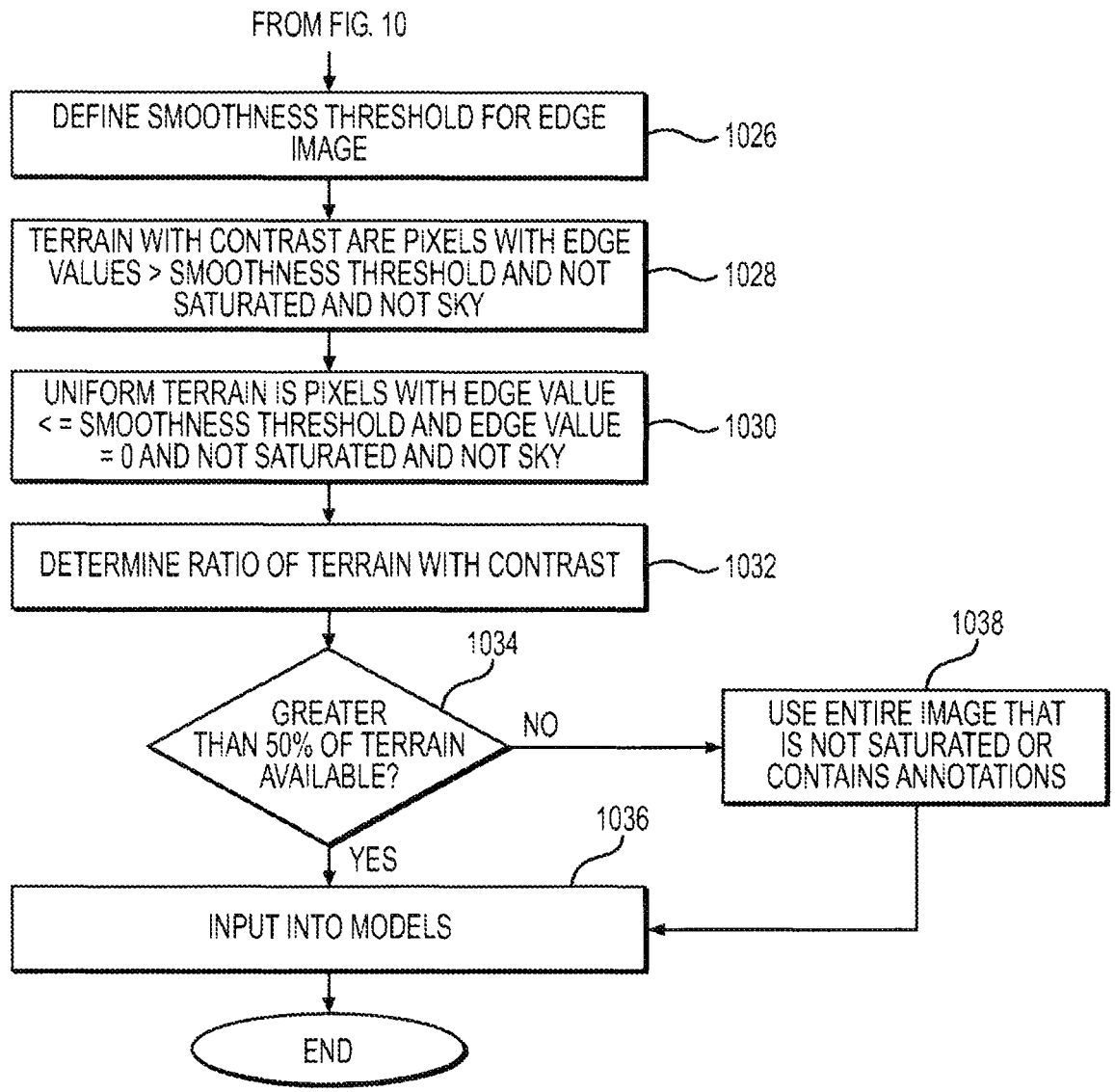

FIG. 10 illustrates more detailed steps in a method for segmenting an image. When the system receives the image 602 to be segmented into sky 902, terrain with contrast 904 (edges) and uniform terrain 906 without edges (step 1002), in one implementation, the system ignores regions that have text and graphics such as logos. Then, the system determines the haze value that occurs the majority of the time (e.g., a threshold of 60%) for pixels in the edge image 802 with texture (i.e., an edge value greater than 0) (step 1004). This threshold value is referred to as "haze value with texture." Next, the system determines the haze value that occurs the majority of the time (e.g., a threshold of 80%) for pixels in the edge image 802 that are smooth (i.e., an edge value equal to 0) (step 1006).

The system then checks if the haze value that occurs most of the time for textured pixels in the edge image 802 is less than the haze value that occurs the majority of the time for smooth pixels in the edge image 802 (step 1008). If it is not, then it increases the majority threshold (e.g., to 98%) when this condition occurs to redefine the haze value that occurs the majority of the time for pixels in the edge image 802 with texture (i.e., an edge value greater than 0) (step 1010). This is the new "haze value with texture," if this condition occurs.

Next, the system identifies pixels in the edge image 802 that are smooth (i.e., an edge value equal to 0) and have a haze value greater than the "haze value with texture" (step 1012). This results in the first cut sky image 1102.

Figure 11:
FIG. 11 shows an example of a first cut sky image in the image segmentation process.

FIG. 11 shows an example of a first cut sky image 1102, where the sky is white and the areas that are not the sky are black. The system determines if the pixels identified in the first cut sky image 1102, with respect to the haze image 702, have a discontinuity for the cumulative histogram of the haze values (step 1014). In one implementation, a discontinuity is a gap between haze value brightness groups, as illustrated in FIG. 12, for example.

Figure 12:
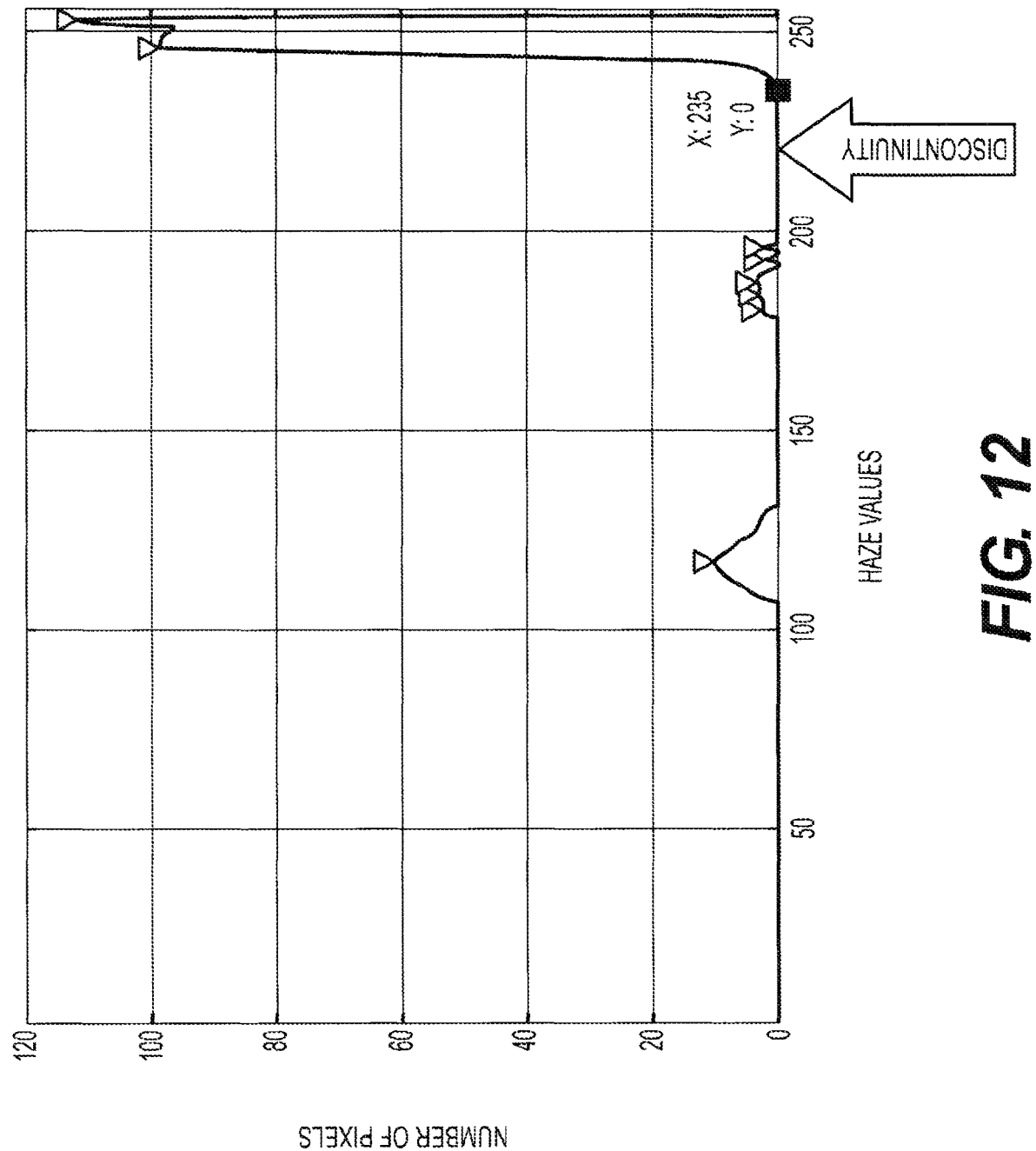
FIG. 12 shows an example of cumulative histogram and a discontinuity.

FIG. 12 shows an example of cumulative histogram and a discontinuity. FIG. 12 illustrates a discontinuity in the cumulative histogram of the haze values in the first cut sky image 1102. The haze values have intensities, in one implementation, from 0 to 255 and the cumulative histogram plot sums up the number of pixels for each brightness value in that range. Therefore, if there is a gap (e.g., a gap value of >13) between brightness values, then that is a discontinuity. This is usually indicative that pixels above the discontinuity are "sky" and the ones below are part of the "terrain." The check is performed so the "terrain" is not inaccurately labeled as "sky." FIG. 12 shows two axes; the left axis is for the number of pixels at a given haze value, and the bottom axis is the haze value. An exemplary discontinuity is shown for a given haze value showing a gap where no pixels have that haze value.

If there is a discontinuity, the system refines the first cut sky image 1102 to be pixels in the edge image 802 that are smooth, e.g., an edge value equal to 0, and have a haze value greater than the point of discontinuity (step 1016). This results in the initial sky pixels image 1302.

Figure 13:
FIG. 13 depicts an example of an initial sky pixels image in the image segmentation process.

FIG. 13 depicts an example of an initial sky pixels image 1302. If there are more than a predefined threshold of pixels, e.g., 10, in the initial sky pixels 1302 (step 1018), then the "sky" is expanded as described below (step 1020); if not, then there is no "sky" (step 1022). This may also be seen as the number of pixels to the right of the discontinuity on FIG. 12.

Figure 14:
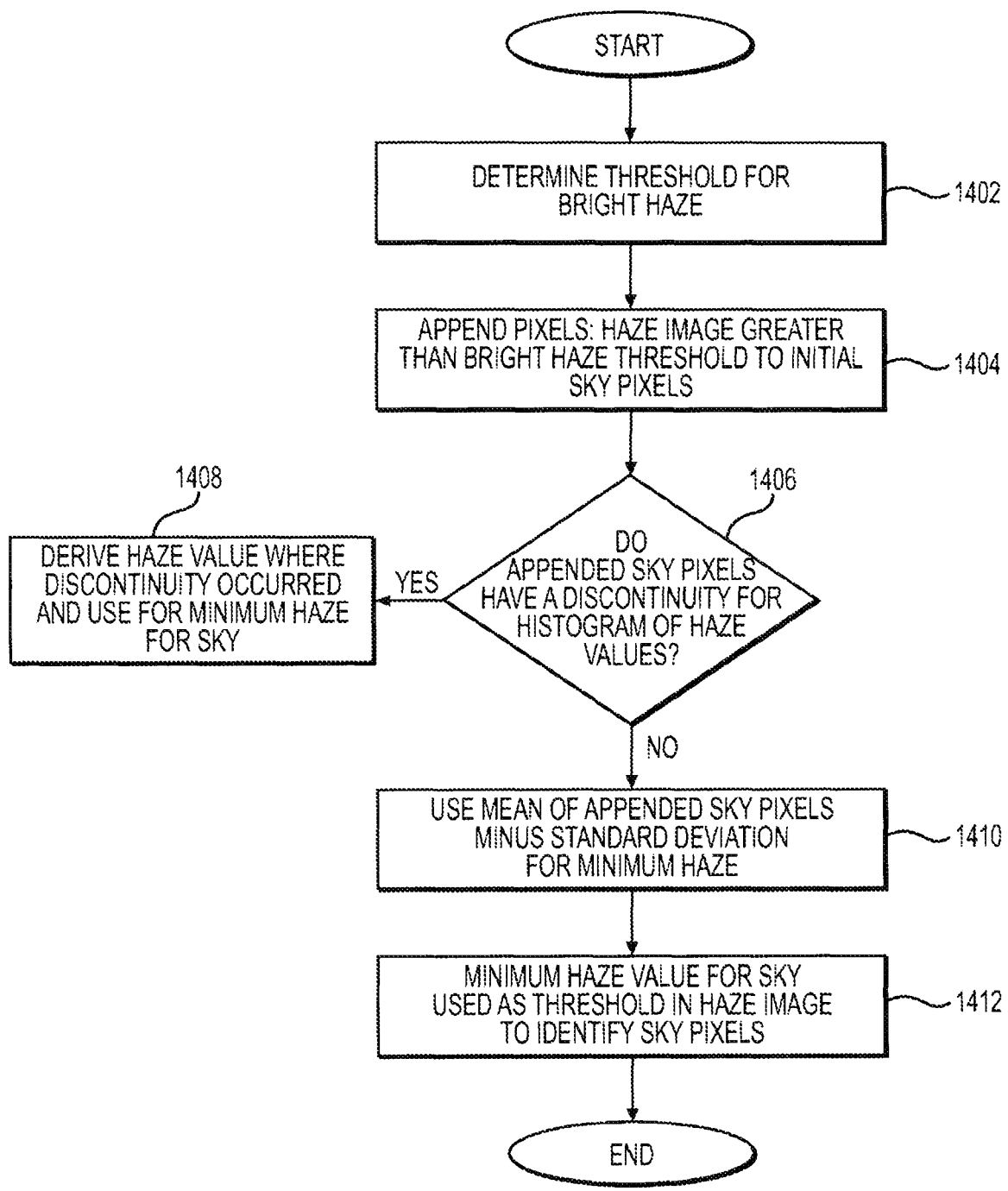
FIG. 14 illustrates steps for sky expansion in the image segmentation process.

FIG. 14 illustrates the steps for sky expansion, i.e., sky image segmentation. Sky expansion is widening the search parameters to identify sky pixels. This expansion is achieved by evaluating bright pixels that have texture but may be part of the sky. Previously, in one implementation, only smooth bright haze values are used to initially identify pixels that may be part of the sky. The condition where bright pixels have texture occurs when there is contrast (i.e., texture) in the clouds or the sky is partly cloudy, meaning there will be an edge between the cloud and the clear sky. The bright haze pixels are included in the determination of if there is a discontinuity or not. The threshold haze value used to identify "sky pixels," (described below) is set by if there is a discontinuity or not. If there is a discontinuity, then the haze value is derived where the discontinuity occurred and value is used for the minimum haze value for the sky. If there is not a discontinuity, the mean of the "appended sky pixels" minus the standard deviation of the "appended sky pixels" for the minimum haze value for the sky is used.

Figure 15:
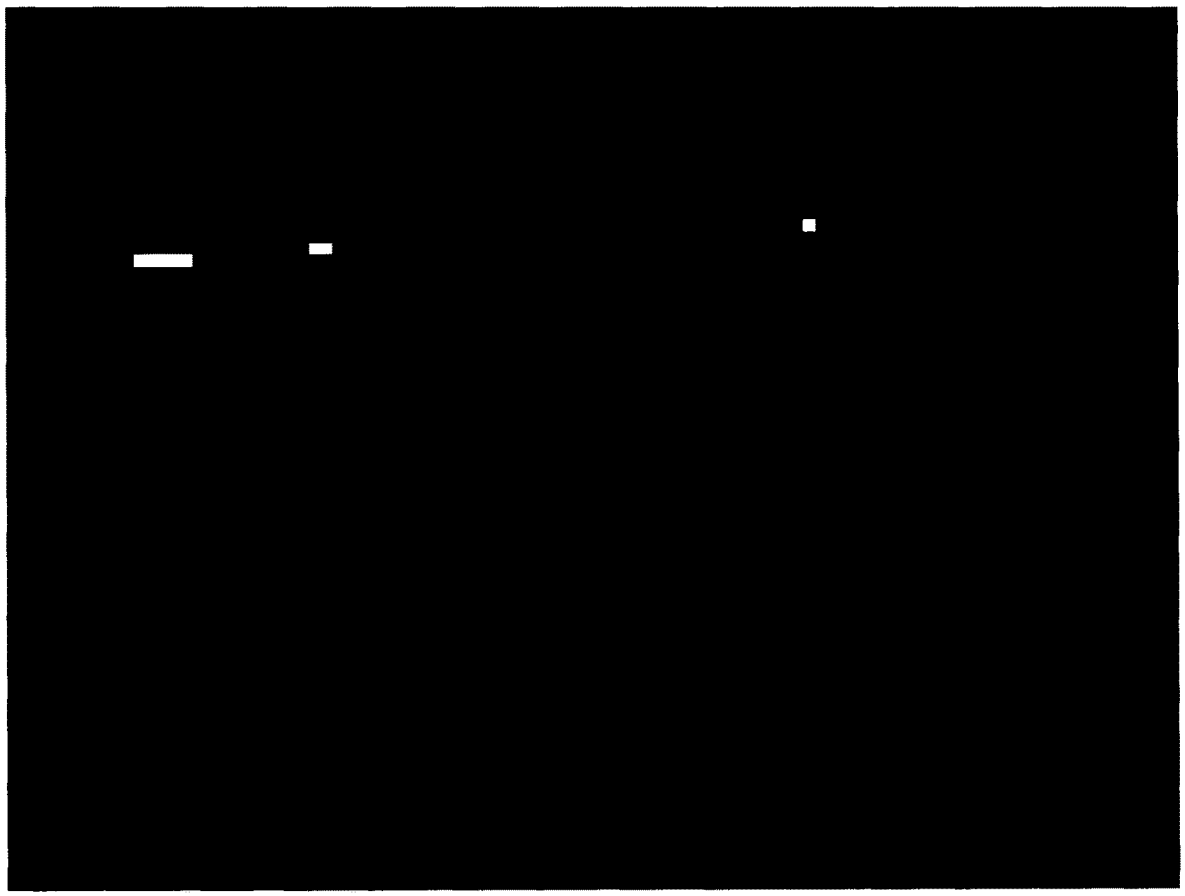
FIG. 15 illustrates an example of new sky pixels in the image segmentation process.

FIG. 15 illustrates an example of new sky pixels 1502. In this figure the white is the sky and the black is not the sky. New sky pixels 1502 are added to the initial sky pixels 1302 to create the appended sky pixels 1602. New sky pixels 1502 are the pixels that are bright and have texture and are additional pixels used to expand the sky. Appended sky pixels 1602 includes both (initial sky pixels 1302 or first cut sky image 1102) and new sky pixels 1502. In summary, this figure highlights the pixels that were added for consideration for the sky expansion.

In the sky expansion of step 1020 of FIG. 10, the system determines a threshold value for "bright" haze (step 1402). In one implementation, bright haze is defined using the median of the initial sky pixels 1302 minus the standard deviation of the initial sky pixels 1302. If the standard deviation of the initial sky pixels 1302 is low, e.g., a value of 25.6, then the threshold is defined as median of the initial sky pixels 1302 minus 25.6. Next, the system appends pixels in the haze image 702 that are greater than the threshold of "bright" haze to the set of initial sky pixels 1302 (step 1404).

Figure 16:
FIG. 16 illustrates an example of appended sky pixels in the image segmentation process.

FIG. 16 illustrates an example of the appended sky pixels 1602. This example shows the appended sky pixels 1602 with the initial sky pixels 1302 and new sky pixels 1502 combined. Again, white is the sky and black is not the sky. The system then determines if the appended sky pixels 1602, with respect to the haze image 702, have a discontinuity for the cumulative histogram of the haze values (step 1406). A discontinuity is a gap between haze value brightness groups, as illustrated in FIG. 12. If there is a discontinuity (step 1406), then the system derives the haze value where the discontinuity occurred and uses that value for the minimum haze value for the "sky" (step 1408). If not (step 1406), then the system uses the mean of the appended sky pixels 1602 minus the standard deviation of the appended sky pixels 1602 for the minimum haze value for "sky" (step 1410).

Figure 17:
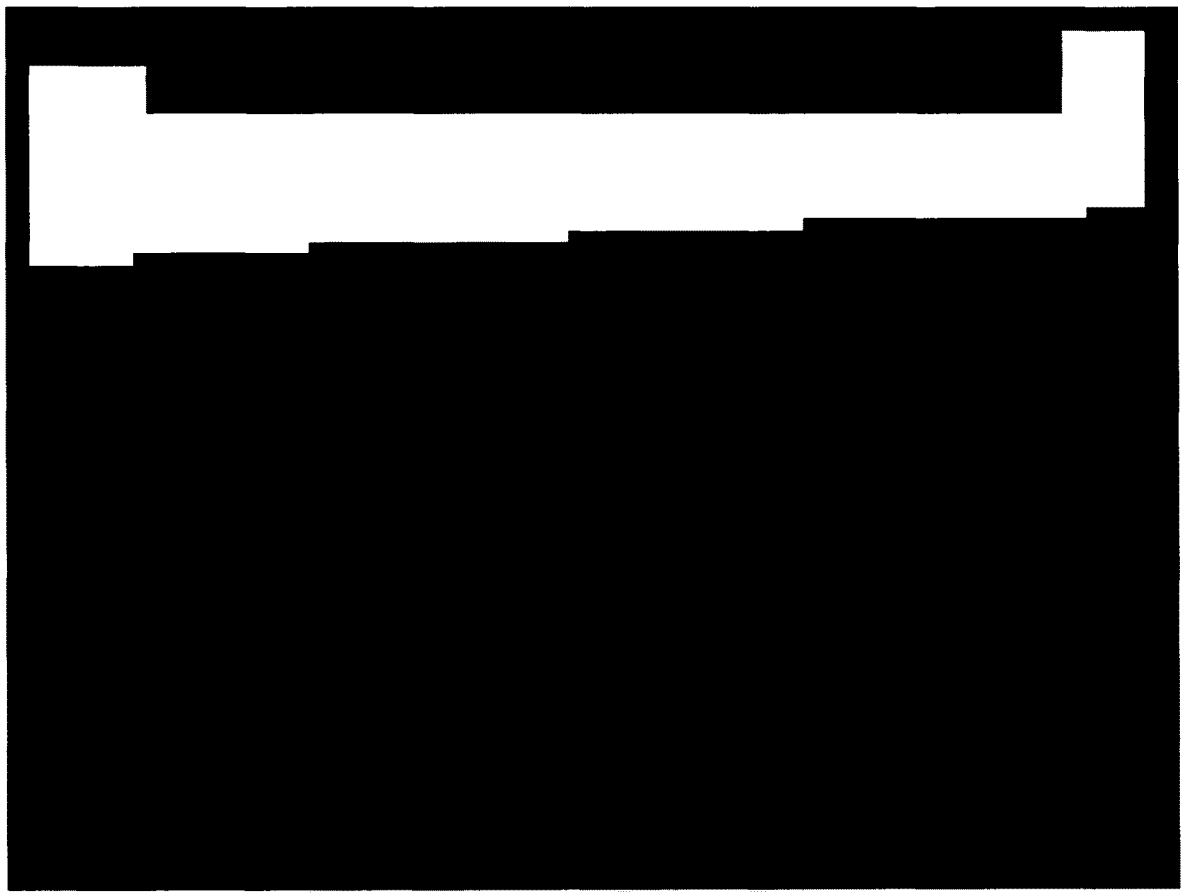
FIG. 17 illustrates an example of the sky pixels in the image segmentation process.

FIG. 17 illustrates an example of the sky pixels 1702. In the image, the sky is white and black is not the sky. The minimum haze value for "sky" is used as the threshold in the haze image 702 to identify the sky pixels 1702 (step 1414).

Referring back to FIG. 10, next, the system identifies saturated pixels in the input image 602 and does not include those in the image segmentation for 904 terrain with contrast 904 and uniform terrain 906 (step 1024).

Figure 18:
FIG. 18 illustrates an example of saturated pixels in the image segmentation process.

FIG. 18 illustrates an example of saturated pixels 1802. In this example, the white area is the saturated pixels, and the black areas are pixels that are not saturated. In one implementation, the system uses a threshold of anything greater than 1% of the image bit depth, e.g., 8-bit depth image is a threshold of 253, to identify saturated pixels.

Additionally, the system defines a "smoothness threshold" for the edge image 802 (step 1026). The following equation provides a "smoothness threshold" that is based on the number of elements evaluated in the window to create the edge image 802, what percentage of those need to have a difference, how significant that difference must be relative to the center pixel, and is scaled based on the average value in the distance weighting filter. This is one implementation, but the "smoothness threshold" could be set in variety of other ways.

In one implementation, the system may use a value of 6.12, for example, which is derived using the following equation: ((windowSize^2)−1)*percentVal*minPixelValue*distanceWeight. Where windowSize=5, percentVal=10%, minPixelValue=1% of the image bit depth (i.e. 2.55), and distance Weight=sum ("Euclidean-weighted 5×5 difference filter")/(windowSize^2−1).

In this equation, the variable windowSize is the length of one side of the window, which is assumed to be square. This length is used to derive how many elements are within the window, minus the center pixel. For example, a 5×5 window would have a windowSize of 5 and result in 24 elements (i.e., pixels), in the window (i.e., (5*5)−1=24).

The variable percentVal is the percent of pixels that need to have a difference, with respect to the center pixel within the window. For example, one implementation uses a value of 10%.

minPixelValue is the minimum pixel value, with respect to the image bit depth−1, that signifies a difference, with respect to the center pixel, within the window. For example, for an 8-bit image, a value of 2.55 may be used.

distanceWeight is the average value in the Euclidean-weight 5×5 difference filter. In one implementation, this equals 0.58.

Next, the pixels that have terrain with contrast 904 are defined as pixels with an edge value greater than the "smoothness threshold" and are not saturated and are not part of the sky pixels 1702 (step 1028).

Figure 19:
FIG. 19 shows an example of terrain with contrast in the image segmentation process.

FIG. 19 shows an example of terrain with contrast 1902. The white area is terrain with contrast, i.e., edges, and the black area is not terrain with contrast (i.e., without edges).

The pixels that have uniform terrain 906 are defined as pixels with an edge value less than or equal to the "smoothness threshold" and that have an edge value equal to 0, i.e., smooth and that are not saturated and are not part of the sky pixels 1702 (step 1030).

Figure 20:
FIG. 20 illustrates an example of uniform terrain in the image segmentation process.

FIG. 20 illustrates an example of uniform terrain 2002. In the Figure, the uniform terrain 906 is white, and the terrain that is not uniform is black.

As discussed above, FIG. 9 illustrates an example of a segmented image. In the image, the sky 902 is blue, the smooth scene 906 is grey, the textured scene 904 is red, and the masked pixels are black.

After the image has been segmented, the ratio of terrain with contrast to the total terrain is derived for an input to that model: (terrain with contrast 904/(terrain with contrast 904+uniform terrain 906)) (step 1032).

Figure 21:
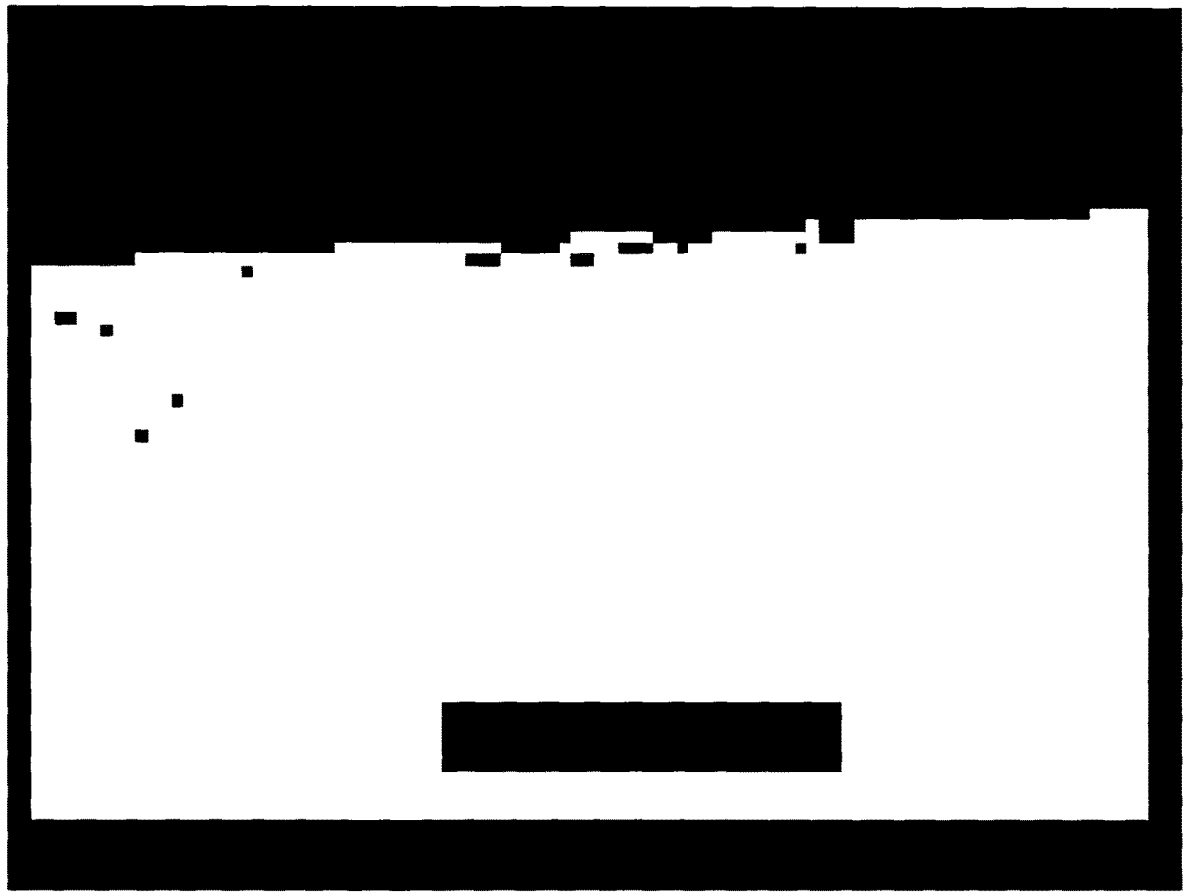
FIG. 21 shows an example of a terrain image in the image segmentation process.

FIG. 21 shows an example of a terrain image 2102. In the image, the terrain is white, and the black is the area that is not terrain. If greater than 50% of the terrain, i.e., uniform terrain 906+terrain with contrast 904, with respect to the available image area (i.e., that is not saturated and does not have annotations) is available (step 1034), then that area of the image is used to derive the input into the remaining 6 models (step 1036). If not, then the entire image is used that is not saturated or contains annotations (step 1038).

Referring back to FIG. 5, after segmenting the image 602 as described above, the system then derives a score for 7 different metrics (step 512) to get to a continuum visibility value. These metrics are derived for input into visibility models. The system focuses on the terrain regions of the image to make the calculations.

Figure 22:
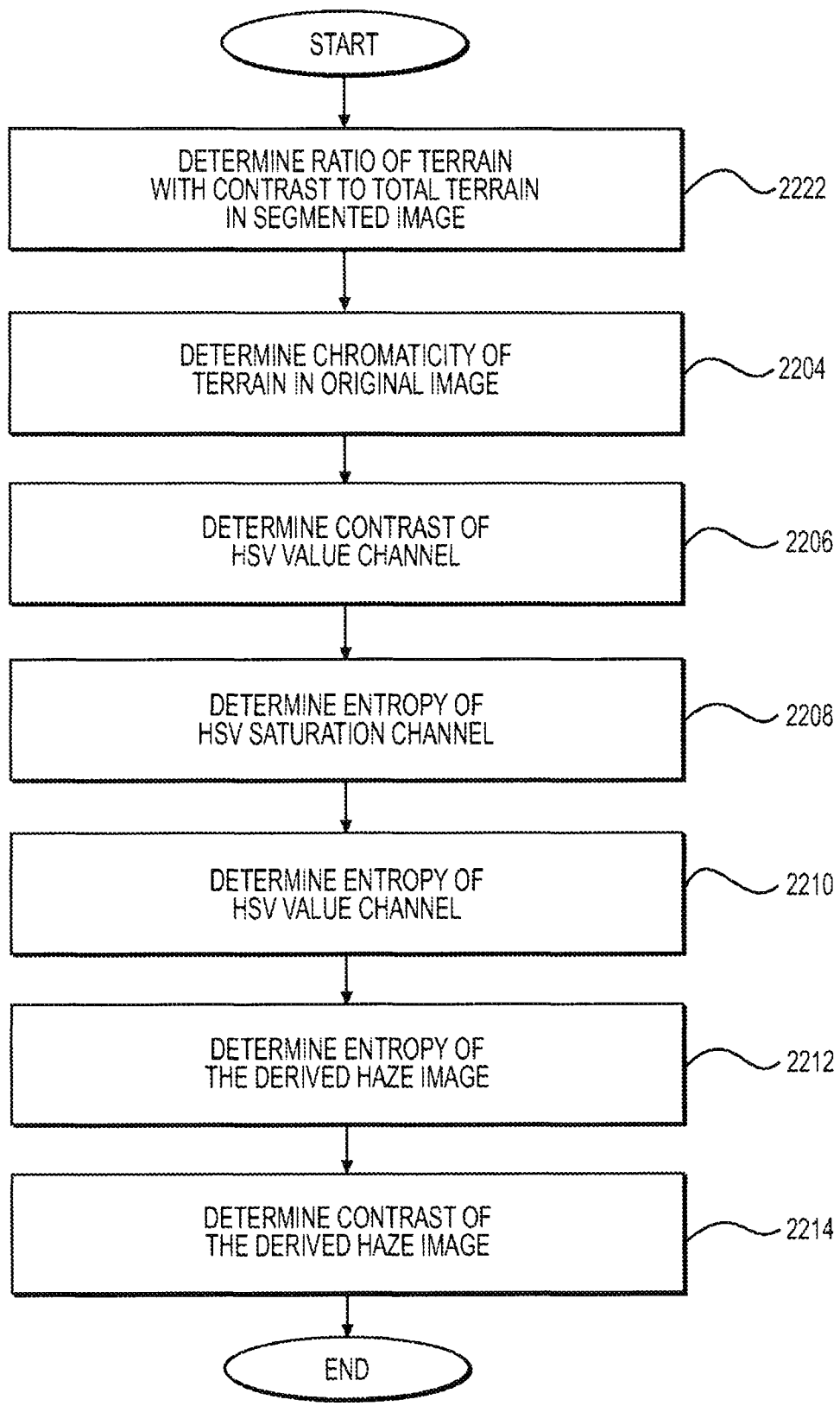
FIG. 22 illustrates 7 metrics that are derived using the segmented image, haze image and edge image.

FIG. 22 discloses the 7 metrics that are derived in step 512 of FIG. 5 using the segmented image, haze image 702 or edge image. The system determines a score for each of these 7 metrics. The first metric is the ratio of terrain with contrast 906 to the total terrain in the segmented image (step 2202). This may be, for example, the ratio of red pixels to red and grey pixels in FIG. 9. Then, the chromaticity of the original image is determined (step 2204) in the areas of the terrain, which was determined in segmentation on the segmented image of FIG. 9. Chromaticity relates to how colorful the original image is, and measuring chromaticity is known in the art. If the terrain area is too small, the system may look at the whole image. For example, if the terrain area is less than 20 percent of the whole image, it may look at the whole image for this measurement.

The third metric is the contrast of the value channel (step 2206). To determine this, the system does a transform on the original image from red-green-blue (RGB) space to Hue Saturation Value (HSV) space. In HSV, the value channel looks like a greyscale image, and this transformation combines the RBG channels into one greyscale representation. The system looks at the contrast within the HSV representation: if it has a lot of contrast, it is likely a good visibility image, and if it has low contrast, for example, without many edges, it is likely a poor visibility image. HSV has a hue channel, a saturation channel and a value channel. In particular, it determines the contrast of the value channel (or band) of the HSV representation.

Next, the system determines the entropy of the saturation channel (step 508) and the value channel (or band) (step 2210) of the HSV-transformed image. The entropy is a measure of how chaotic (or non-uniform) the image is. If it is fairly uniform, then the image is likely a poor visibility image. If it is not uniform, it likely has good visibility. Measuring entropy is known in the art.

Finally, the system determines the entropy (step 2212) and contrast (step 2214) of the derived haze image 702. If it is uniform and/or has a low amount of edges, it likely has poor visibility. If it does not, it likely has good visibility.

Referring back to FIG. 5, the system generates a single visibility score for each metric by plugging each of the values of the metrics into a model (step 514). This model may represent, for example, an equation. From the resulting 7 visibility scores, the system generates a single visibility score from a weighted average of these 7 visibility scores, as described below with respect to FIG. 7 (step 516).

The single score may represent a continuum measure of visibility on the single daytime image, for example, from 0 to 10, 1 to 10, or poor to good. In one implementation, there are 7 models, one for each metric, that the values of the 7 metrics are plugged into to derive a visibility score for that metric. This is part of the process to go from 7 values from the metrics (FIG. 22) to one final visibility value or score.

The process for deriving the visibility score for each metric is plugging the metric value into the model. For example, the chromaticity visibility score=0.2786*Chromaticity−1.219. The other models/equations for converting the 7 metrics to a visibility score are shown below.

FIGS. 23A-G illustrate graphs showing the relation of visibility to the metric (e.g., chromaticity) for each of the 7 models of the metrics. For example, the chromaticity visibility model is shown on FIG. 23A, corresponding to the chromaticity visibility score model/equation above. This shows the relation of the chromaticity metric value to the related chromaticity visibility score.

Figure 23A:
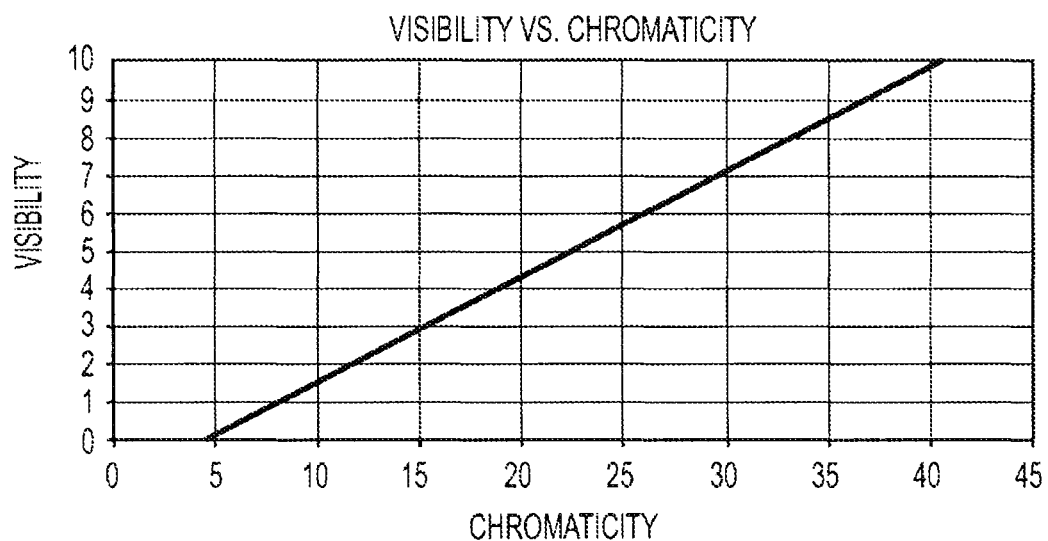
FIGS. 23A-G illustrate graphs showing the relation of visibility to the metric (e.g., chromaticity) for each of the 7 models of the metrics.
Figure 23B:
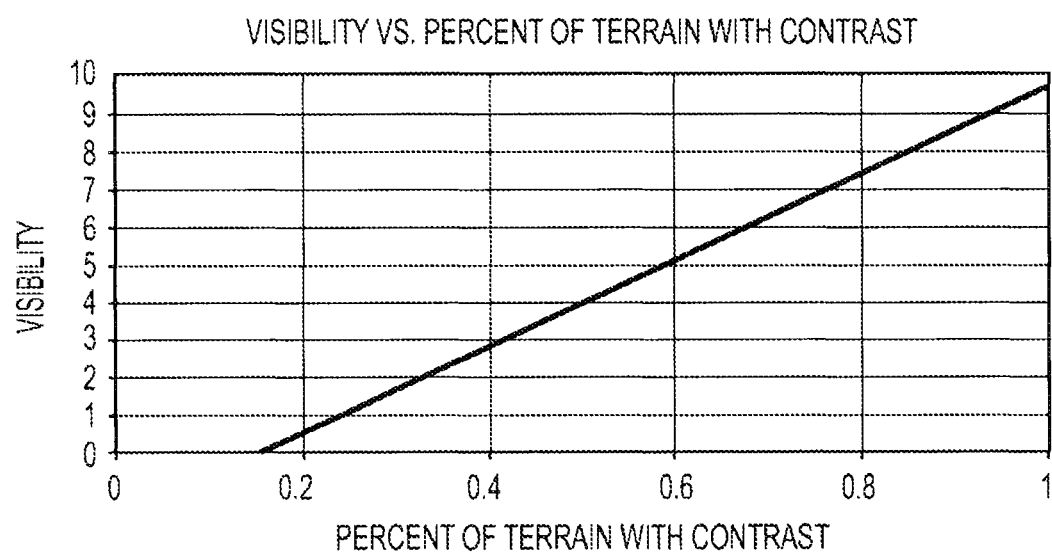
Figure 23C:
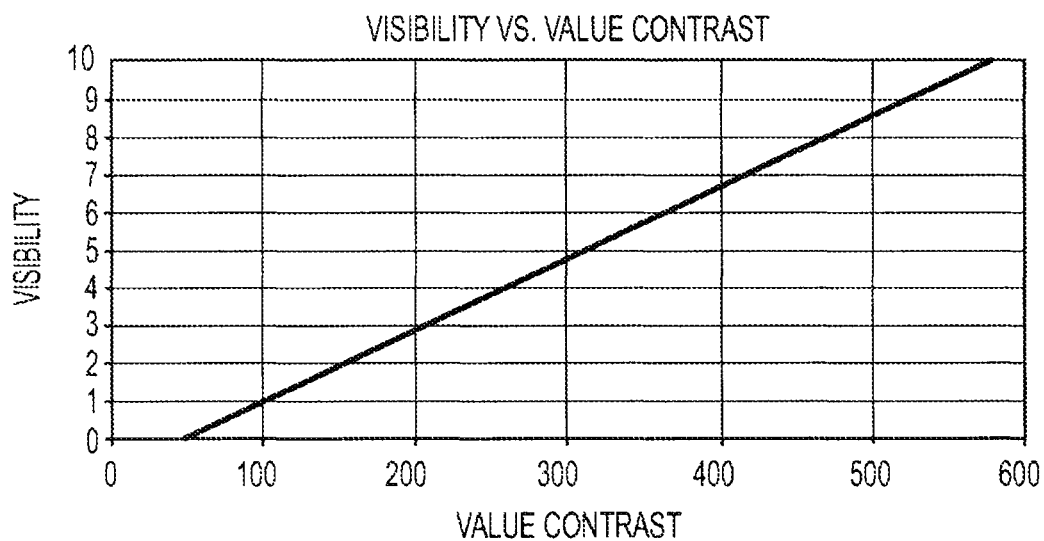
Figure 23D:
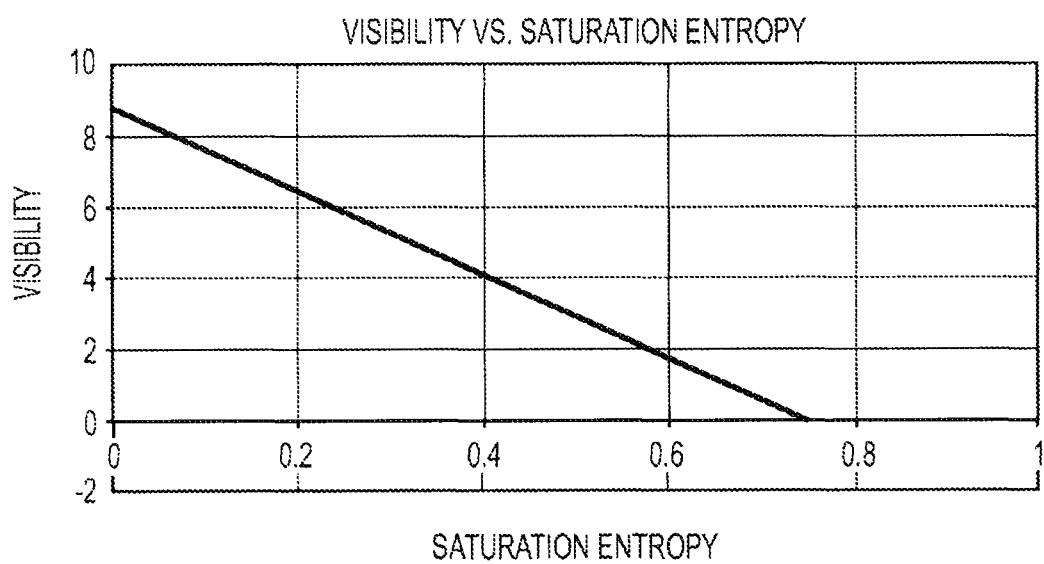
Figure 23E:
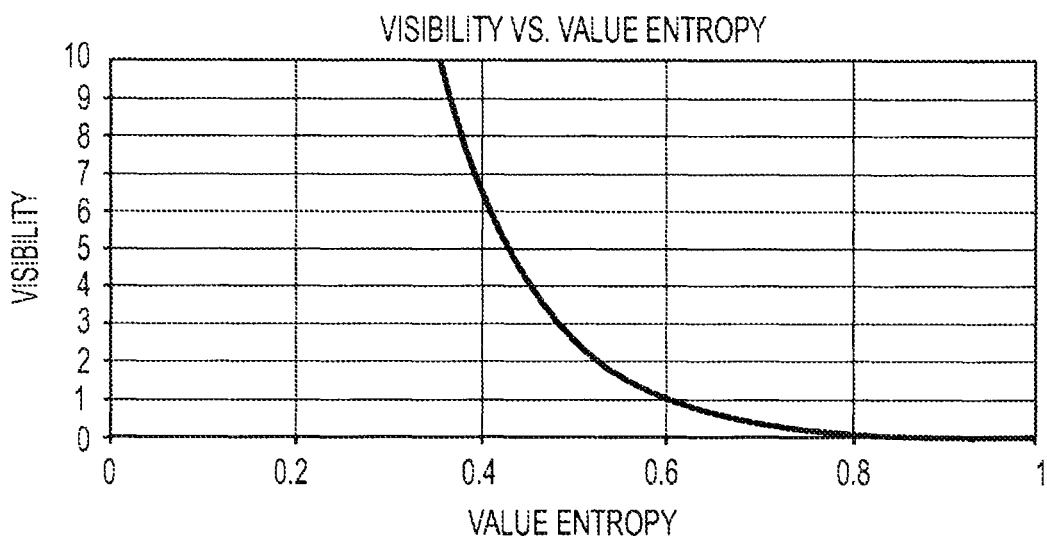

The visibility score for the ratio of terrain with contrast 904 to the total terrain=11.43*Percent of Terrain with Contrast−1.714, and is shown on FIG. 23B.

The visibility score for the contrast of the value channel=0.01884*Contrast of the Value Channel−0.9667, and is shown on FIG. 6C.

The visibility score for entropy of the saturation channel=−11.67*Entropy of the Saturation Channel+8.75. This is shown on FIG. 23D.

The visibility score for entropy of the value channel=6234.07319225692*Entropy of the Value Channel$^{10}$−38111.9020356451*Entropy of the Value Channel$^9$+104632.766668496*Entropy of the Value Channel$^8$−171672.309236502*Entropy of the Value Channel$^7$+189378.919312219*Entropy of the Value Channel$^6$−149934.93237039*Entropy of the Value Channel$^5$+88425.3933498943*Entropy of the Value Channel$^4$−39218.9048665454*Entropy of the Value Channel$^3$+12689.1873815424*Entropy of the Value Channel−2711.25867728084*Entropy of the Value Channel+288.995035726631. This is shown on FIG. 23E. (This means the entropy of the value channel is a single variable value, but the same variable value is used multiple times with exponents in the model/equation).

Figure 23F:
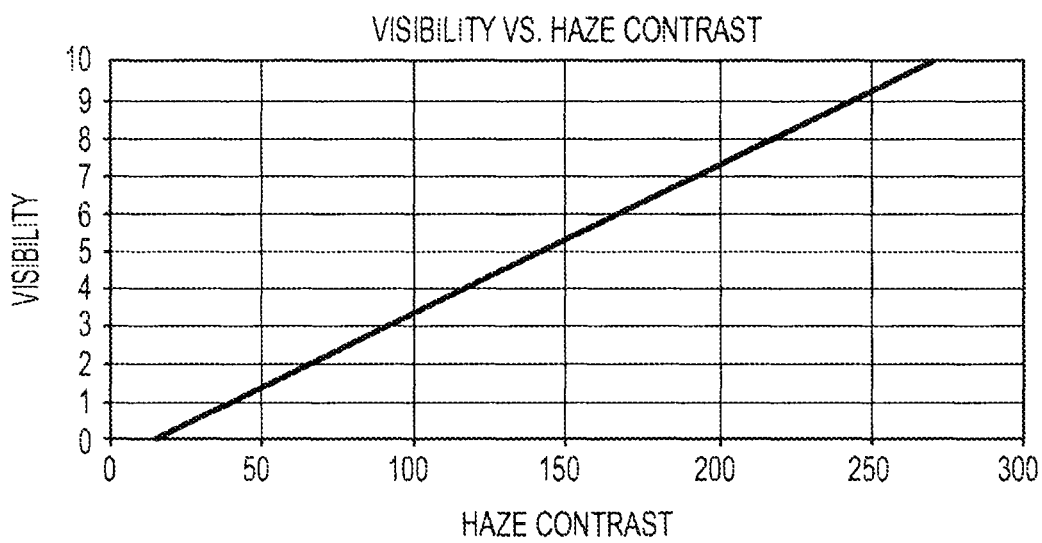
Figure 23G:
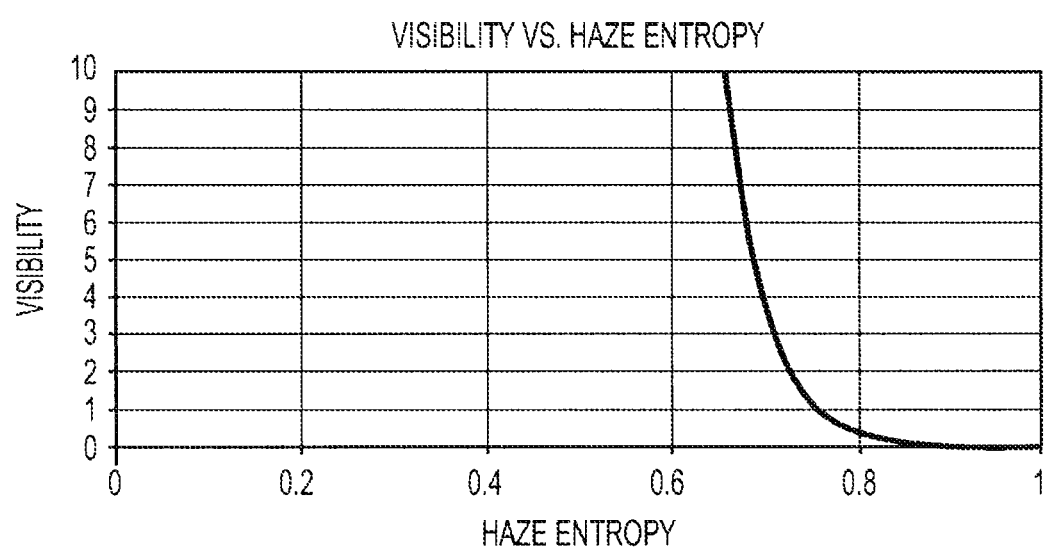

The visibility score for contrast of the derived haze image=0.03845*Contrast of the Haze Image−0.5107, and is shown on FIG. 23F.

The visibility score for entropy of the derived haze image=−1347509.02510379*Entropy of the Haze Image$^9$+10615625.1857743*Entropy of the Haze Image$^8$−37184393.3517056*Entropy of the Haze Image$^7$+76029571.258485*Entropy of the Haze Image$^6$−100030131.667162*Entropy of the Haze Image$^5$+87849710.0514848*Entropy of the Haze Image$^4$−51519642.7963728*Entropy of the Haze Image$^3$+19463491.2489163*Entropy of the Haze Image$^2$−4300330.47909659*Entropy of the Haze Image+423609.578590118. This is shown on FIG. 23G. These equations and models for transformation of the metrics to visibilities scores may vary from the implementation shown.

Figure 24:
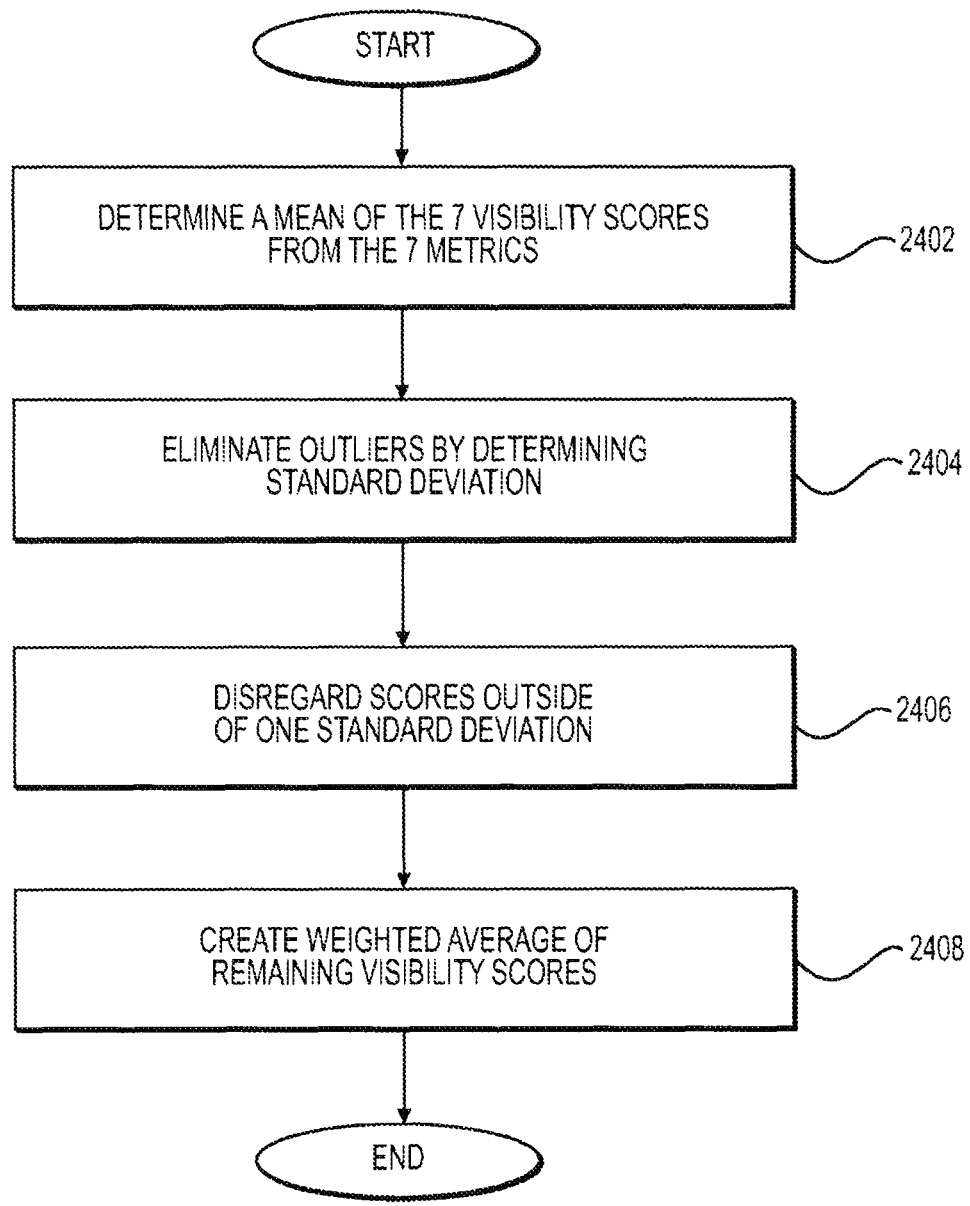
FIG. 24 illustrates steps for creating a single final visibility score generated by creating a weighted average of the 7 visibility scores derived from the 7 metrics.

FIG. 24 illustrates the steps for creating a single final visibility score that is generated by applying a weighted average of the 7 visibility scores derived from the 7 metrics. First, the system determines a mean of the 7 visibility scores derived from the 7 metrics (step 2402). Then to eliminate outliers, a standard deviation is determined from the mean (step 2404). If any of the 7 visibility scores are outside (plus or minus) one standard deviation of the mean, that visibility score is considered an outlier and is disregarded (step 2406). That is, the majority of the group as a whole is considered correct, versus any one individual visibility score. Next, the system creates a weighted average of the remaining visibility scores (step 2408). Each visibility score may have a different weight applied to it when the up-to-7 non-outlier visibility scores are averaged together.

The weights for the visibility scores relate to the confidence in that visibility score category's effect on the accuracy of the actual visibility. The resulting weighted average is the final visibility score of a single daytime image without prior knowledge of the environment or camera system. The resulting weighted average may be rounded to an integer, for example, and outputted.

In one implementation, the weighting applied is specific to the output visibility value for each of the 7 models, where the visibility value is in the range of 0 to 10.0. The weighting applied for each model is shown below, where the weighting value is in the range of 0 to 1.0. A "weightValue"<1.0 indicates a lower confidence in the visibility value for the respective visibility range for that model.

For ratio of terrain with contrast to the total terrain:
If visibilityValue<=7 then weightValue=1.0
else visibilityValue>7 then weightValue=0.75
For chromaticity:
weightValue=1.0
For contrast of the value channel:
If visibilityValue<=0.5 then weightValue=1.0
else visibilityValue>0.5 then weightValue=0.75
For entropy of the saturation channel:
If visibilityValue<=0.25 then weightValue=1.0
Else (visibilityValue>0.25) AND (visibilityValue<=3.0) then weightValue=0.5
Else visibilityValue>3.0 then weightValue=0.75
For entropy of the value channel:
If visibilityValue<=0.7 then weightValue=1.0
Else (visibilityValue>0.7) AND (visibilityValue<3.0) then weightValue=0.5
Else visibilityValue>=3.0 then weightValue=0.75
For entropy of the derived haze image:
If visibilityValue<=0.2 then weightValue=1.0
else visibilityValue>0.2 then weightValue=0.25
For contrast of the derived haze image:
If visibilityValue<=2.0 then weightValue=1.0
else visibilityValue>2.0 then weightValue=0.5

After the standard deviation of the 7 visibility values is computed, as well as the weighted average and outliers are removed that are outside of the weighted average +/− the standard deviation, if there are more than 3 visibility values left that have a weight>=0.75 then the two previous steps are repeated but instead of weighted average the median value of the non-outliers is derived. Lastly with the outliers removed, the combined visibility value is derived using a weighted average The following is the equation for deriving the weighted average:

$$\text{Visibility} = \Sigma(\text{Visibility}_{models} \times \text{Weights}_{models}) / \Sigma \text{Weights}_{models}$$

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

The invention claimed is:

1. A method in a data processing system for determining a measure of visibility from a single daytime image without prior knowledge of a camera that created the image, comprising:
   receiving the daytime image from the camera without information about the camera;
   determining a score of visibility of the received daytime image based on the daytime image without being based on information about the camera and without being based on another image;
   calculating haze and detecting edges in the daytime image;
   segmenting the daytime image using the calculated haze and edges into: (1) sky, (2) terrain with contrast and (3) uniform terrain;
   calculating metrics based on the segmenting, wherein the metrics include one or more of: (1) a ratio of terrain with contrast to total terrain, (2) chromaticity of the daytime image, (3) contrast of a value channel of an Hue Saturation Value (HSV) transformation of the daytime image, (4) entropy of a saturation channel of the HSV transformation of the daytime image, (5) entropy of a value channel of the HSV transformation of the daytime image, (6) entropy of a haze image, and (7) contrast of the haze image; and
   transmitting the determined score of visibility of the received daytime image.

2. The method of claim 1, wherein the another image is of a same environment as depicted in the daytime image.

3. The method of claim 1, wherein information about the camera further comprises information about an environment the camera is in.

4. The method of claim 1, further comprising:
   creating a visibility score corresponding to each calculated metric by applying a corresponding formula to each calculated metric.

5. The method of claim 4, wherein determining a score of visibility further comprises:
   removing visibility scores corresponding to each calculated metric that are outside of a standard deviation from a mean of the visibility scores corresponding to each calculated metric.

6. The method of claim 5, wherein determining a score of visibility further comprises:
   determining the score of visibility of the daytime image by creating a weighted average of the remaining visibility scores corresponding to each calculated metric.

7. A method in a data processing system for determining a measure of visibility from single daytime image without prior knowledge of a camera that created the image, comprising:
   receiving a daytime image from the camera without information about the camera;
   determining a white point of the daytime image;
   calculating haze of the daytime image to create a haze image;
   detecting edges of the daytime image to create an edge image;
   segmenting the daytime image into (1) sky, (2) terrain with contrast and (3) uniform terrain, using the haze image and the edge image to create a segmented image;
   calculating metrics from the terrain with contrast and uniform terrain of the segmented image;
   calculating the metrics based on the segmenting, wherein the metrics include: (1) a ratio of terrain with contrast to total terrain, (2) chromaticity daytime image, (3) contrast of a value channel of an Hue Saturation Value (HSV) transformation of the daytime image, (4) entropy of a saturation channel of the HSV transformation of the daytime image, (5) entropy of a value channel of the HSV transformation of the daytime image, (6) entropy of the haze image, and (7) contrast of the haze image;
   determining a visibility score from each metric using an equation corresponding to the metric; and
   determining a final visibility score by determining a weighted average of the visibility scores corresponding to the metrics.

8. The method of claim 7, wherein calculating the metrics further comprises:
   transforming the daytime image into HSV space to determine the contrast of the value channel of the HSV transformation of the daytime image, the entropy of the saturation channel of the HSV transformation of the daytime image, and the entropy of the value channel of the HSV transformation of the daytime image.

9. The method of claim 7, further comprising:
   creating a visibility score corresponding to each calculated metric by applying a corresponding formula to each calculated metric.

10. The method of claim 7, wherein the final visibility score is in a continuum range from 0 to 10.

11. The method of claim 7, wherein the received daytime image is a true color red-green-blue image.

12. The method of claim 9, further comprising:
    eliminating visibility scores outside of one standard deviation from the mean of the visibility scores from the weighted average for the final visibility score.

13. A data processing system for determining a measure of visibility from a single daytime image without prior knowledge of a camera that created the image, comprising:
    a memory storing instructions to cause a processor to:
    receive a daytime image from the camera without information about the camera;
    determine a score of visibility of the received daytime image based on the daytime image without being based on information about the camera and without being based on another image;
    calculate haze and detect edges in the daytime image;
    segment the daytime image using the calculated haze and edges into: (1) sky, (2) terrain with contrast and (3) uniform terrain;
    calculate metrics based on the segmenting, wherein the metrics include one or more of: (1) a ratio of terrain with contrast to total terrain, (2) chromaticity of the daytime image, (3) contrast of a value channel of an Hue Saturation Value (HSV) transformation of the daytime image, (4) entropy of a saturation channel of the HSV transformation of the daytime image, (5) entropy of a value channel of the HSV transformation of the daytime image, (6) entropy of a haze image, and (7) contrast of the haze image; and create a visibility score corresponding to each calculated metric by applying a corresponding formula to each calculated metric; and transmit the determined score of visibility of the received daytime image; and a processor configured to execute the instructions.

14. The data processing system of claim 13, further comprising:

the camera configured to capture the daytime image and transmit the daytime image over a network.

15. The data processing system of claim 13, wherein the camera is in a network of multiple cameras configured to capture image to be transmitted over the network.

* * * * *